United States Patent
Chen et al.

(10) Patent No.: US 10,763,621 B2
(45) Date of Patent: Sep. 1, 2020

(54) FLAT PANEL DISPLAY APPARATUS AND CONDUCTIVE SHEET THEREOF

(71) Applicant: QISDA CORPORATION, Taoyuan (TW)

(72) Inventors: Chia-Pao Chen, Taoyuan (TW); Wei-Hsin Hsu, Taoyuan (TW)

(73) Assignee: Qisda Corporation, Taoyuan (TW)

(*) Notice: Subject to any disclaimer, the term of this patent is extended or adjusted under 35 U.S.C. 154(b) by 0 days.

(21) Appl. No.: 16/556,184

(22) Filed: Aug. 29, 2019

(65) Prior Publication Data
US 2020/0161809 A1    May 21, 2020

(30) Foreign Application Priority Data
Nov. 15, 2018   (TW) .............................. 107140512 A

(51) Int. Cl.
| | |
|---|---|
| *H01R 13/73* | (2006.01) |
| *H01R 13/655* | (2006.01) |
| *H01R 13/652* | (2006.01) |
| *H01R 12/71* | (2011.01) |

(52) U.S. Cl.
CPC ......... *H01R 13/655* (2013.01); *H01R 12/716* (2013.01); *H01R 13/652* (2013.01)

(58) Field of Classification Search
CPC ... H01R 13/655; H01R 12/716; H01R 13/652
USPC ........................................................ 439/76.1
See application file for complete search history.

(56) References Cited

U.S. PATENT DOCUMENTS

| | | | | |
|---|---|---|---|---|
| 7,445,498 | B2* | 11/2008 | Tsuo .................... | H01R 13/748 439/562 |
| 7,621,770 | B1* | 11/2009 | Finizio ............... | H01R 13/6275 439/354 |
| 2004/0203269 | A1* | 10/2004 | Kameyama ........ | H01R 13/6471 439/108 |
| 2016/0268716 | A1* | 9/2016 | Conger ................ | H01R 12/716 |
| 2017/0201661 | A1* | 7/2017 | Conger ................ | H04N 5/2252 |

* cited by examiner

*Primary Examiner* — Abdullah A Riyami
*Assistant Examiner* — Nelson R. Burgos-Guntin

(57) ABSTRACT

A flat panel display apparatus includes a flat panel display device, a conductive frame, a circuit board, a connector having a ground terminal, and a conductive sheet. The conductive frame is disposed at a back surface of the flat panel display device. The circuit board is disposed in the conductive frame and is electrically connected to the flat panel display device. The connector is disposed on the circuit board and is disposed through the conductive frame. The conductive sheet includes a connecting sheet portion, a ground sheet portion, and a main sheet portion. The connecting sheet portion is connected to the ground terminal. The main sheet portion extends from the connecting sheet portion to the ground sheet portion along a contour of the connector, to make the ground sheet portion be located at a side of the connector and contact the conductive frame for ground connection of the connector.

12 Claims, 4 Drawing Sheets

FLAT PANEL DISPLAY APPARATUS AND CONDUCTIVE SHEET THEREOF

BACKGROUND OF THE INVENTION

1. Field of the Invention

The present invention relates to a flat panel display apparatus and a conductive sheet thereof, and more specifically, to a flat panel display apparatus having a conductive sheet extending along a contour of a connector to contact a conductive frame and a conductive sheet thereof.

2. Description of the Prior Art

In general, a circuit board in a flat panel display apparatus usually has connectors for transmitting different kinds of electrical signals, such as AC sockets, ear jacks, D-SUB connectors, DVI connectors, and HDMI connectors. In practical application, for avoiding electromagnetic interference during the signal transmission process, the conventional method involves utilizing an additional ground wire to be electrically connected to a ground pad of the circuit board and a ground terminal of the connector for ground connection of the connector. However, the aforesaid method requires more wiring space and causes a time-consuming and strenuous connector assembly process.

SUMMARY OF THE INVENTION

The present invention provides a flat panel display apparatus. The flat panel display apparatus includes a flat panel display device, a conductive frame, a circuit board, a connector, and a conductive sheet. The conductive frame is disposed at a back surface of the flat panel display device. The circuit board is disposed in the conductive frame and electrically connected to the flat panel display device. The connector is disposed on the circuit board and disposed through the conductive frame. The connector has a ground terminal. The conductive sheet includes a connecting sheet portion, at least one ground sheet portion, and a main sheet portion. The connecting sheet portion is connected to the ground terminal. The main sheet portion extends from the connecting sheet portion to the at least one ground sheet portion along a contour of the connector, to make the at least one ground sheet portion be located at a side of the connector and contact the conductive frame for ground connection of the connector.

The present invention further provides a conductive sheet applied to a flat panel display apparatus. The flat panel display apparatus includes a flat panel display device, a conductive frame, a circuit board, and a connector. The conductive frame is disposed at a back surface of the flat panel display device. The circuit board is disposed in the conductive frame and electrically connected to the flat panel display device. The connector is disposed on the circuit board and disposed through the conductive frame. The connector has a ground terminal. The conductive sheet includes a connecting sheet portion, at least one ground sheet portion, and a main sheet portion. The connecting sheet portion is connected to the ground terminal. The main sheet portion extends from the connecting sheet portion to the at least one ground sheet portion along a contour of the connector, to make the at least one ground sheet portion be located at a side of the connector and contact the conductive frame for ground connection of the connector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
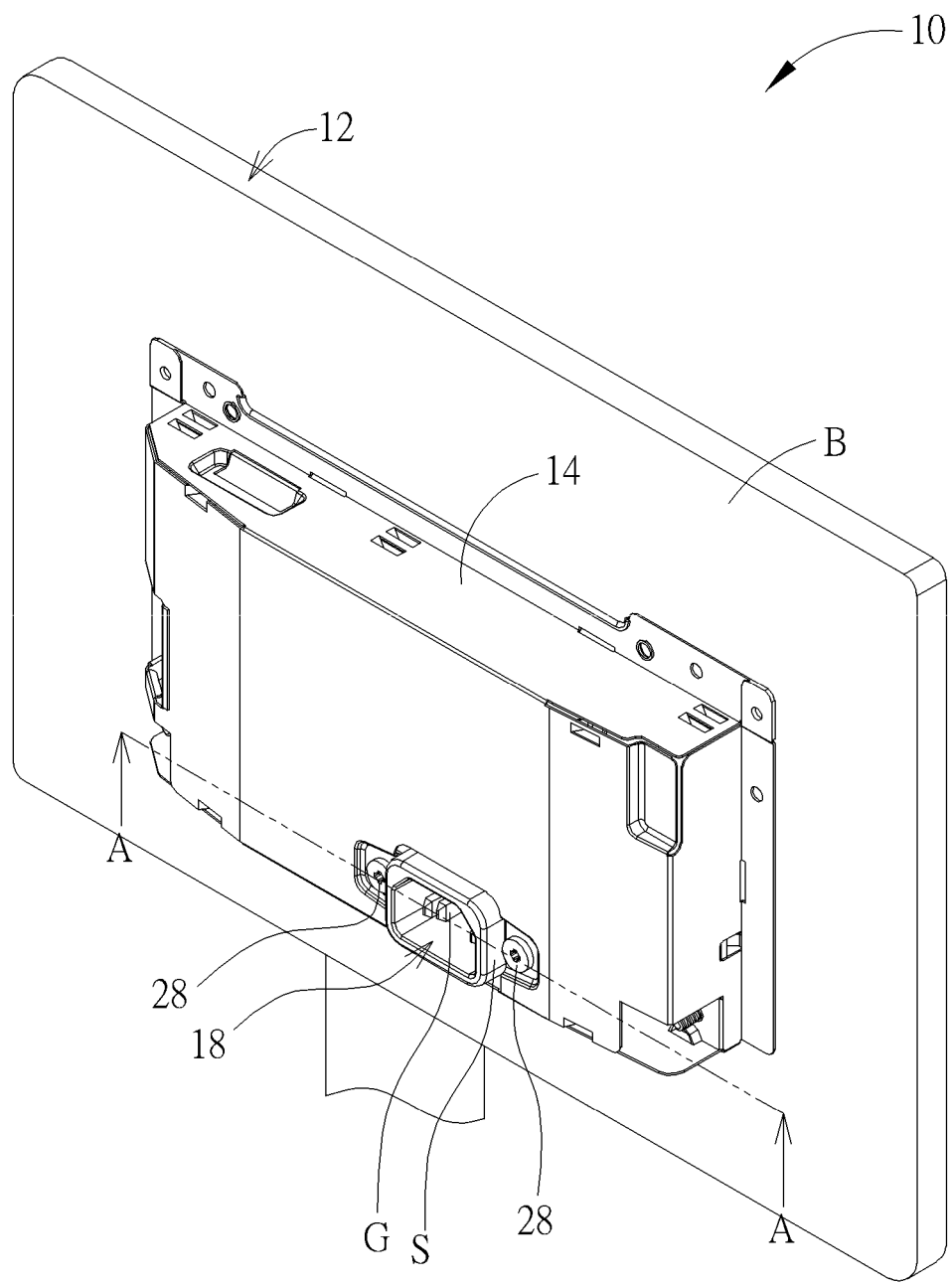
FIG. 1 is a partial diagram of a flat panel display apparatus according to an embodiment of the present invention.
Figure 2:
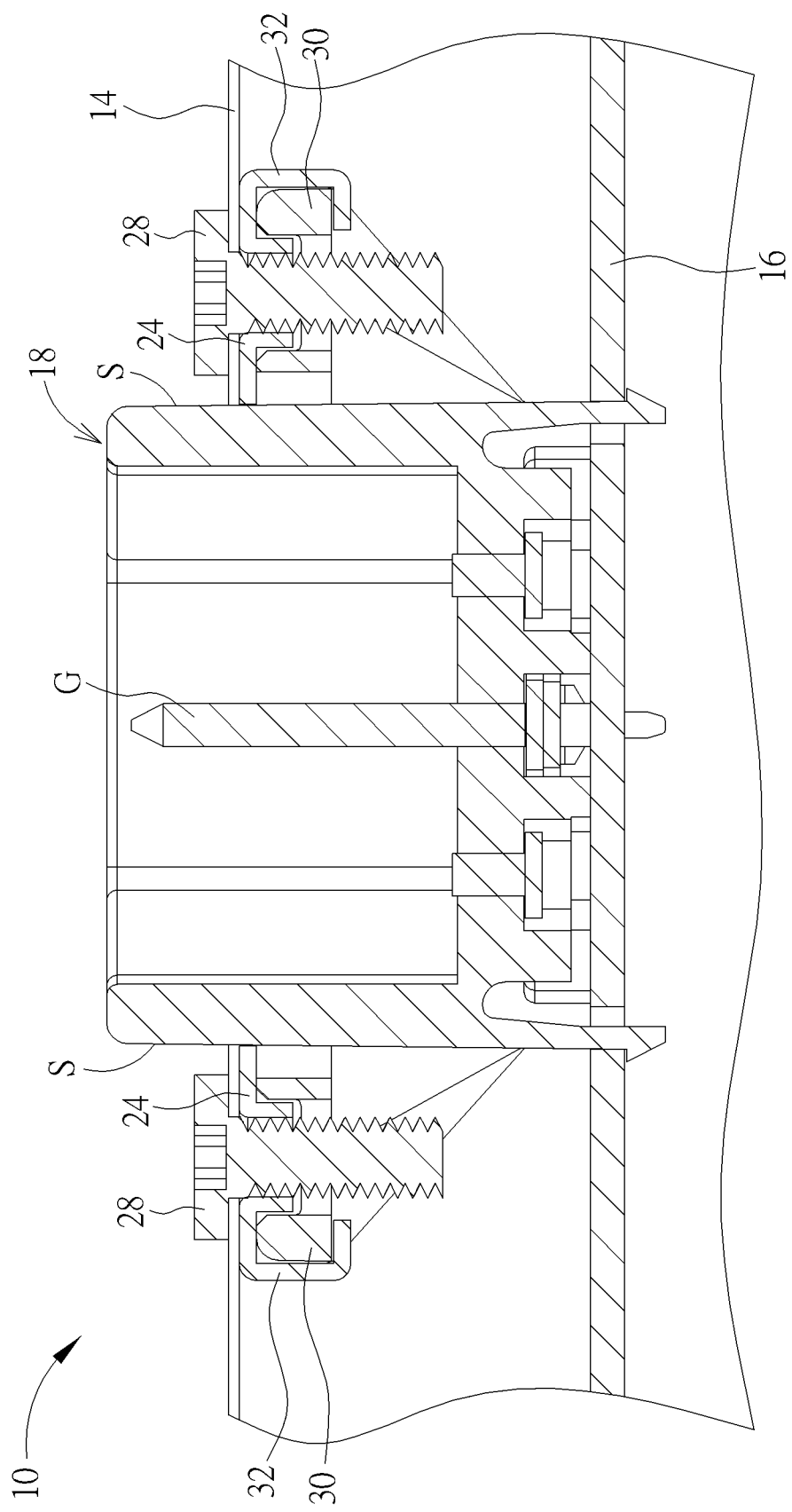
FIG. 2 is a partial cross-sectional diagram of the flat panel display apparatus in FIG. 1 along a cross-sectional line A-A.
Figure 3:
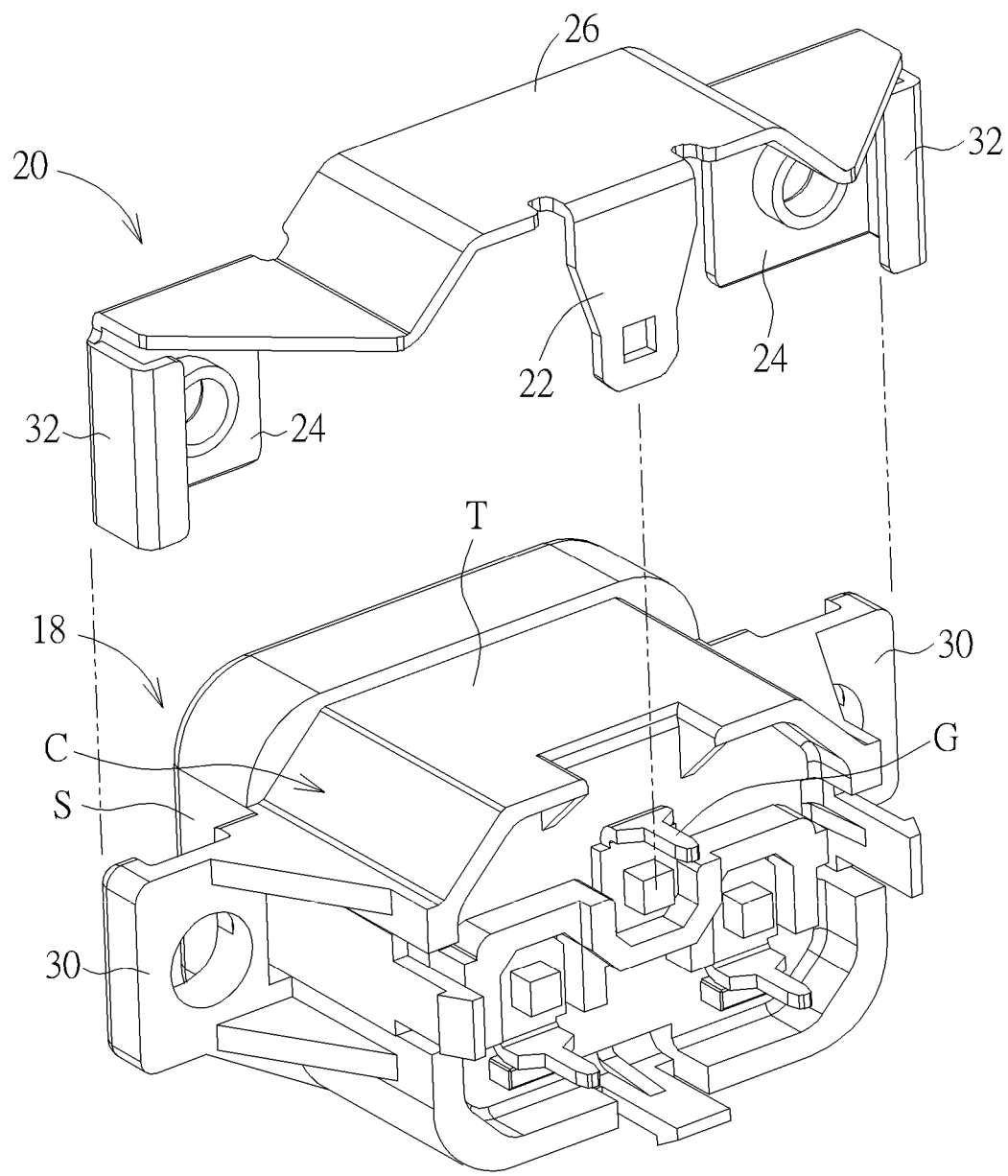
FIG. 3 is an exploded diagram of a connector and a conductive sheet in FIG. 2.

Please refer to FIG. 1, FIG. 2, and FIG. 3. FIG. 1 is a partial diagram of a flat panel display apparatus 10 according to an embodiment of the present invention. FIG. 2 is a partial cross-sectional diagram of the flat panel display apparatus 10 in FIG. 1 along a cross-sectional line A-A. FIG. 3 is an exploded diagram of a connector 18 and a conductive sheet 20 in FIG. 2. As shown in FIGS. 1-3, the flat panel display apparatus 10 includes a flat panel display device 12, a conductive frame 14, a circuit board 16, the connector 18, and the conductive sheet 20. The flat panel display device 12 could be a conventional flat panel display monitor (e.g. a desktop LCD monitor, but not limited thereto). The conductive frame 14 (e.g. a metal frame) is disposed on a back surface B of the flat panel display device 12. The circuit board 16 is disposed in the conductive frame 14 and is electrically connected to the flat panel display device 12 for controlling the flat panel display device 12, such as brightness control or power control.

As for the related description for structural engagement and ground connection of the connector 18 and the conductive sheet 20, it can be as shown in FIG. 2 and FIG. 3. The connector 18 could preferably be an AC socket as shown in FIG. 3, but not limited thereto, meaning that the connector 18 could be other type of connector commonly applied to a flat panel display apparatus in another embodiment, such as an ear jack, a D-SUB connector, a DVI connector, or an HDMI connector. The connector 18 is disposed on the circuit board 16 and is disposed through the conductive frame 14. The connector 18 has a ground terminal G for ground connection. The conductive sheet 20 includes a connecting sheet portion 22, at least one ground sheet portion 24 (two shown in FIG. 3, but not limited thereto) and a main sheet portion 26. The connecting sheet portion 22 is connected to the ground terminal G (e.g. by riveting or welding). The main sheet portion 26 extends from the connecting sheet portion 22 to the ground sheet portion 24 along a contour C of the connector 18, so as to make the ground sheet portion 24 be located at a side S of the connector 18 and contact the conductive frame 14 for ground connection of the connector 18.

To be more specific, in this embodiment, the main sheet portion 26 extends to be connected to the ground sheet portion 24 along a top surface T of the contour C of the connector 18, but not limited thereto, meaning that the present invention could adopt the design in which the main sheet portion extends to be connected to the ground sheet portion along a lateral surface or a bottom surface of the contour of the connector in another embodiment.

In practical application, the flat panel display apparatus 10 could further include a fixing member 28 (e.g. a screw) corresponding to the ground sheet portion 24, and an ear portion 30 is formed on the connector 18 corresponding to the ground sheet portion 24. Accordingly, the fixing member 28 can penetrate the conductive frame 14, the conductive sheet portion 24, and the ear portion 30 (as shown in FIG. 2) to fix the ground sheet portion 24 between the ear portion 30 and the conductive frame 14, such that the ground sheet portion 24 can be attached to the conductive frame 14 in a surface contact manner for ground connection of the connector 18. In such a manner, the present invention can prevent the connector 18 from electromagnetic interference when the connector 18 transmits electrical signals.

To be noted, the contact design for the ground sheet portion 24 and the conductive the frame 14 is not limited to the aforesaid embodiment in which the conductive frame, the ground sheet portion of the conductive sheet and ear portion of the connector are fixed by the fixing member. That is to say, all ground connection designs involving utilizing the ground sheet portion extending from the conductive sheet along the contour of the connector to be located at a side of the connector to contact the conductive frame fall within the scope of the present invention. For example, in another embodiment, the ground sheet portion of the conductive sheet provided by the present invention could be a resilient sheet extending along the contour of the connector and abutting against the conductive frame in a pre-pressing manner. Accordingly, the conductive sheet could directly contact the conductive frame via the ground sheet portion in a surface contact manner for ground connection of the connector without performing any fixing operation, so as to simplify the connector assembly process.

Furthermore, for improving the connection strength between the conductive sheet 20 and the connector 18, as shown in FIG. 2 and FIG. 3, an engaging structure 32 could bend from the ground sheet portion 24 toward the ear portion 30. The engaging structure 32 could be engaged with the ear portion 30 to position the conductive sheet 30 on the connector 18 more firmly, so as to prevent the conductive sheet 20 from accidentally falling off the connector 18.

In summary, compared with the prior art utilizing an additional ground wire to be coupled to a ground pad of the circuit board and a ground terminal of the connector, the present invention adopts the ground connection design that the conductive sheet extends along the contour of the connector to contact the conductive frame. Thus, the present invention can efficiently solve the prior art problem that the wiring method requires more wiring space and causes a time-consuming and strenuous connector assembly process, so as to save the assembly cost of the connector. Further, the present invention can reduce internal space of the flat panel display apparatus needed for ground connection of the connector via the design that the conductive sheet is directly attached to the connector in a surface contact manner, so as to be advantageous to the thinning design of the flat panel display apparatus.

Figure 4:
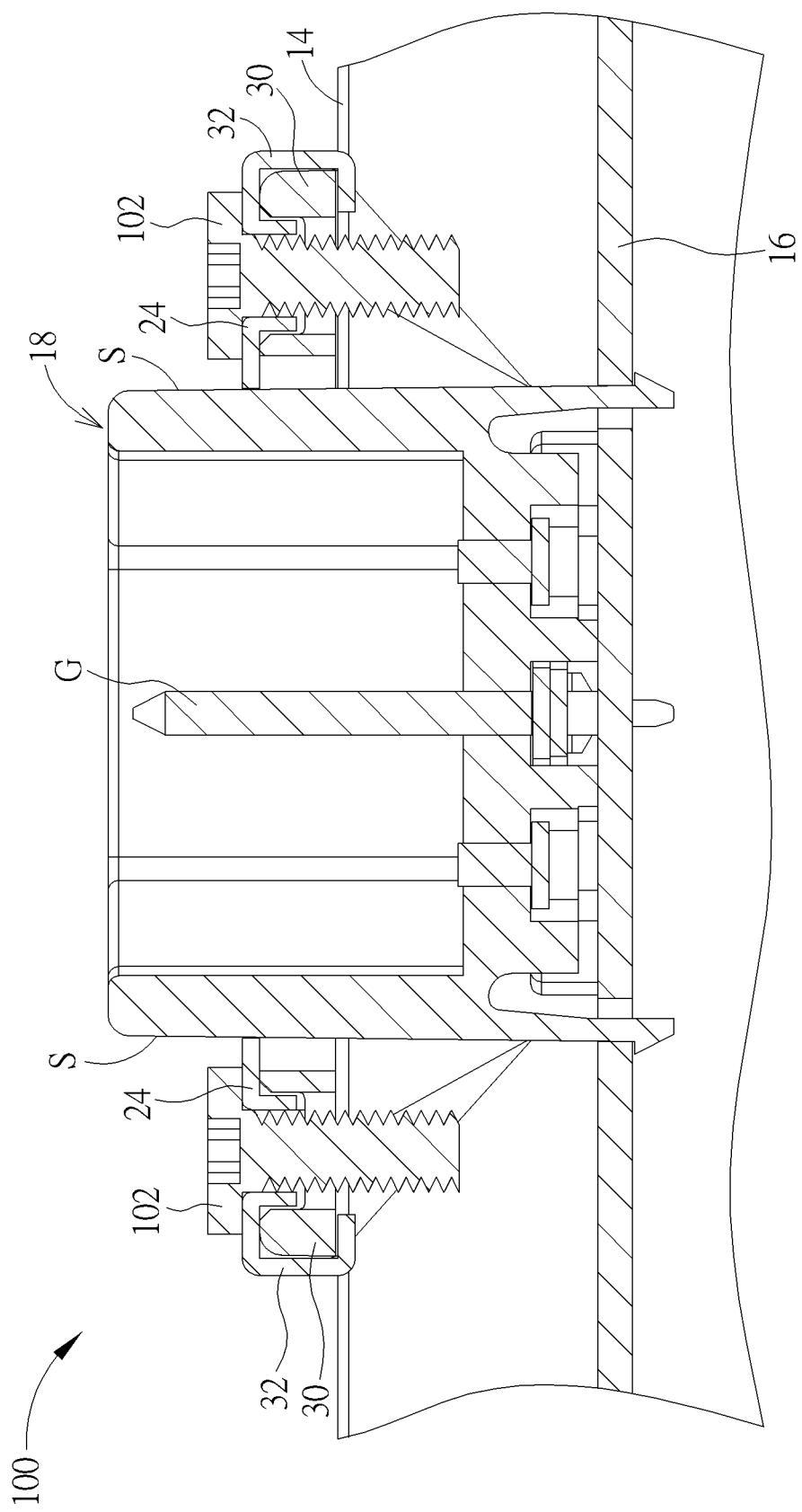
FIG. 4 is a partial cross-sectional diagram of a flat panel display apparatus according to another embodiment of the present invention.

It should be mentioned that the fixing design for the conductive frame, the ground sheet portion of the conductive sheet, and the ear portion of the connector is not limited to the aforesaid embodiment. For example, please refer to FIG. 4, which is a partial cross-sectional diagram of a flat panel display apparatus 100 according to another embodiment of the present invention. Components both mentioned in this embodiment and the aforesaid embodiment represent components with similar structures or functions, and the related description is omitted herein. As shown in FIG. 4, the flat panel display apparatus 100 includes the flat panel display device 12 (not shown in FIG. 4), the conductive frame 14, the circuit board 16, the connector 18, the conductive sheet 20, and a conductive fixing member 102 (e.g. a metal screw). In this embodiment, the conductive fixing member 102 could penetrate the ground sheet portion 24 of the connector 18, the ear portion of the connector 18, and the conductive frame 14 sequentially for fixing the ground sheet portion 24 to the ear portion 30, such that the ground sheet portion 24 could be electrically connected to the conductive frame 14 via the conductive fixing member 102 for ground connection of the connector 18. In such a manner, the present invention can prevent the connector 18 from electromagnetic interference when the connector 18 transmits electrical signals.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flat panel display apparatus comprising:
   a flat panel display device;
   a conductive frame disposed at a back surface of the flat panel display device;
   a circuit board disposed in the conductive frame and electrically connected to the flat panel display device;
   a connector disposed on the circuit board and disposed through the conductive frame, the connector having a ground terminal; and
   a conductive sheet comprising:
      a connecting sheet portion connected to the ground terminal;
      at least one ground sheet portion; and
      a main sheet portion extending from the connecting sheet portion to the at least one ground sheet portion along a contour of the connector, to make the at least one ground sheet portion be located at a side of the connector and contact the conductive frame for ground connection of the connector.

2. The flat panel display apparatus of claim 1, wherein the flat panel display apparatus further comprises a fixing member corresponding to the at least one ground sheet portion, an ear portion is formed on the connector corresponding to the at least one ground sheet portion, and the fixing member penetrates the conductive frame, the at least one ground sheet portion, and the ear portion for fixing the at least one ground sheet portion between the ear portion and the conductive frame to make the at least one ground sheet portion attached to the conductive frame in a surface contact manner.

3. The flat panel display apparatus of claim 2, wherein an engaging structure bends from the at least one ground sheet portion toward the ear portion, and the engaging structure is engaged with the ear portion to position the conductive sheet on the connector.

4. The flat panel display apparatus of claim 1, wherein the flat panel display apparatus further comprises a conductive fixing member corresponding to the at least one ground sheet portion, an ear portion is formed on the connector corresponding to the at least one ground sheet portion, and the conductive fixing member penetrates the conductive frame, the ear portion, and the at least one ground sheet portion for fixing the at least one ground sheet portion on the ear portion to make the at least one ground sheet portion electrically connected to the conductive frame via the conductive fixing member.

5. The flat panel display apparatus of claim 4, wherein an engaging structure bends from the at least one ground sheet portion toward the ear portion, and the engaging structure is engaged with the ear portion to position the conductive sheet on the connector.

6. The flat panel display apparatus of claim 1, wherein the main sheet portion extends to be connected to the at least one ground sheet portion along a top surface of the contour of the connector.

7. A conductive sheet applied to a flat panel display apparatus, the flat panel display apparatus comprising a flat panel display device, a conductive frame, a circuit board, and a connector, the conductive frame being disposed at a back surface of the flat panel display device, the circuit board being disposed in the conductive frame and electrically connected to the flat panel display device, the connector being disposed on the circuit board and disposed through the conductive frame, the connector having a ground terminal, the conductive sheet comprising:
  a connecting sheet portion connected to the ground terminal;
  at least one ground sheet portion; and
  a main sheet portion extending from the connecting sheet portion to the at least one ground sheet portion along a contour of the connector, to make the at least one ground sheet portion be located at a side of the connector and contact the conductive frame for ground connection of the connector.

8. The conductive sheet of claim 7, wherein the flat panel display apparatus further comprises a fixing member corresponding to the at least one ground sheet portion, an ear portion is formed on the connector corresponding to the at least one ground sheet portion, and the fixing member penetrates the conductive frame, the at least one ground sheet portion, and the ear portion for fixing the at least one ground sheet portion between the ear portion and the conductive frame to make the at least one ground sheet portion attached to the conductive frame in a surface contact manner.

9. The conductive sheet of claim 8, wherein an engaging structure bends from the at least one ground sheet portion toward the ear portion, and the engaging structure is engaged with the ear portion to position the conductive sheet on the connector.

10. The conductive sheet of claim 7, wherein the flat panel display apparatus further comprises a conductive fixing member corresponding to the at least one ground sheet portion, an ear portion is formed on the connector corresponding to the at least one ground sheet portion, and the conductive fixing member penetrates the conductive frame, the ear portion, and the at least one ground sheet portion for fixing the at least one ground sheet portion on the ear portion to make the at least one ground sheet portion electrically connected to the conductive frame via the conductive fixing member.

11. The conductive sheet of claim 10, wherein an engaging structure bends from the at least one ground sheet portion toward the ear portion, and the engaging structure is engaged with the ear portion to position the conductive sheet on the connector.

12. The conductive sheet of claim 7, wherein the main sheet portion extends from a top surface of the contour of the connector to be connected to the at least one ground sheet portion.

* * * * *